United States Patent [19]
Reed et al.

[11] Patent Number: 4,518,235
[45] Date of Patent: May 21, 1985

[54] COLLAPSIBLE DISPOSABLE CAMERA

[75] Inventors: Richard K. Reed, Pendleton; James R. Reed, Indianapolis, both of Ind.; James D. Sorg, 1709 Queensbridge Dr., Indianapolis, Ind. 46219

[73] Assignee: James D. Sorg, Indianapolis, Ind.

[21] Appl. No.: 577,491

[22] Filed: Feb. 6, 1984

[51] Int. Cl.³ .............................................. G03B 17/52
[52] U.S. Cl. .................................... 354/86; 354/187; 354/245; 354/288
[58] Field of Search ................... 354/84, 85, 86, 187, 354/194, 202, 245, 248, 288

[56] References Cited

U.S. PATENT DOCUMENTS

| | | | |
|---|---|---|---|
| 2,143,385 | 1/1939 | Platt | 354/187 |
| 2,323,009 | 6/1943 | Claudot et al. | |
| 2,751,825 | 6/1956 | Fried | 354/288 |
| 2,880,658 | 4/1959 | Land et al. | 354/85 |
| 2,933,027 | 4/1960 | Hollingworth et al. | |
| 3,412,662 | 11/1968 | Balalis | |
| 3,547,020 | 12/1970 | Goldfarb | |

*Primary Examiner*—A. A. Mathews
*Attorney, Agent, or Firm*—Woodard, Weikart, Emhardt & Naughton

[57] ABSTRACT

A disposable camera constructed to produce a single photograph and to collapse to a stored position. A top wall and bottom wall are spaced apart by a pair of inwardly folding side walls and a pair of outwardly folding side walls. A negative is slidably mounted adjacent the back wall and is alignable with a photographic paper slidably mounted against one side wall and to the top wall. A shutter is moveable across an aperture in the front wall to allow light to pass to the negative. A pair of rollers are mounted to the camera box with the photographic paper and negative moving therebetween developing the photograph on the paper.

16 Claims, 5 Drawing Figures

COLLAPSIBLE DISPOSABLE CAMERA

BACKGROUND OF THE INVENTION

This invention is in the field of cameras and more specifically those which may be collapsed in a stored condition and subsequently discarded after a single use. Cameras typically are quite expensive and thus are designed to have a relatively long life. Many instances occur, however, when only a single photograph is required allowing for the subsequent discarding of the camera if it were not for the high cost of the camera. For example, many insurance companies require the insurance applicant to submit a photograph of a building prior to issuance of insurance relating to the building. Lengthy delays are incurred in view of the time required to develop the typical camera film assuming a self-developing camera is not immediately available. In such a case, it is extremely advantageous for a self developing, low cost camera to be available allowing discharging of the camera after a single use. It also is desirable for such a camera to be collapsible in order for the insurance company to initially mail or otherwise provide the disposable camera to the insurance applicant. Heretofore, it has not been known to provide such a camera which is both collapsible to facilitate the mailing thereof and constructed to issue a single self-developing photograph while at a low cost to allow the discarding thereof after a single use. Disclosed herein is such a camera.

U.S. Pat. No. 3,412,662, issued to Balais on Nov. 26, 1968 discloses a disposable camera produced from a plastic material without the collapsible mailing feature of the camera disclosed herein. Another plastic camera is disclosed in U.S. Pat. No. 2,933,027, issued to Hollingworth et al. on Apr. 19, 1960, whereas U.S. Pat. Nos. 2,323,009, issued to Claudot et al. on June 29, 1943 and U.S. Pat. No. 3,547,020, issued to Goldfarb on Dec. 15, 1970, respectively relate to a photographic apparatus made up of a series of detachable parts and to a compact toy camera.

SUMMARY OF THE INVENTION

One embodiment of the present invention is a disposable camera comprising a camera box having an aperture and being moveable between a collapsed position and an erected position, a lens mounted over the aperture, shutter means mounted to the box adjacent the aperture and operable to open and close the aperture allowing light therethrough, photographic paper within the box, photographic negative within the box having a light developable surface facing the aperture, and first guide means mounted within the box and engaged with the photographic paper operable to position the paper in a flat, uncreased condition adjacent the light developable surface and between the aperture and the surface when in the collapsed position and to move the paper away from the surface allowing an unobstructed view from the aperture to the surface when in the erected position.

A further object of the present invention is a disposable camera comprising a collapsible camera box including a front wall with aperture, a back wall with an interior negative guide and foldable side walls connecting the front wall to the back wall, one side wall having an interior photographic paper guide attached thereto, a lens mounted to the front wall and aligned with the aperture, shutter means mounted to the front wall and operable to open and close the aperture, photographic negative slidably mounted to the negative guide to receive a light image from the aperture, and photographic paper slidably mounted to the paper guide and positioned atop the negative between the aperture and negative when the box is collapsed and positioned away therefrom against the one side wall and the top wall when the box is erected.

It is an object of the present invention to provide a new and improved camera.

A further object of the present invention is to provide a relatively low cost disposable camera.

Yet another object of the present invention is to provide a collapsible camera which will issue a single self-developing photograph.

Further, it is an object of the present invention to provide a collapsible, disposable camera for issuing a single self-developing photograph.

In addition, it is an object of the present invention to provide a collapsible, disposable camera having means to automatically align the photographic paper and film while preventing creasing of either the paper or film.

Related objects and advantages of the present invention will be apparent from the following description.

DESCRIPTION OF THE PREFERRED EMBODIMENT

Figure 1:
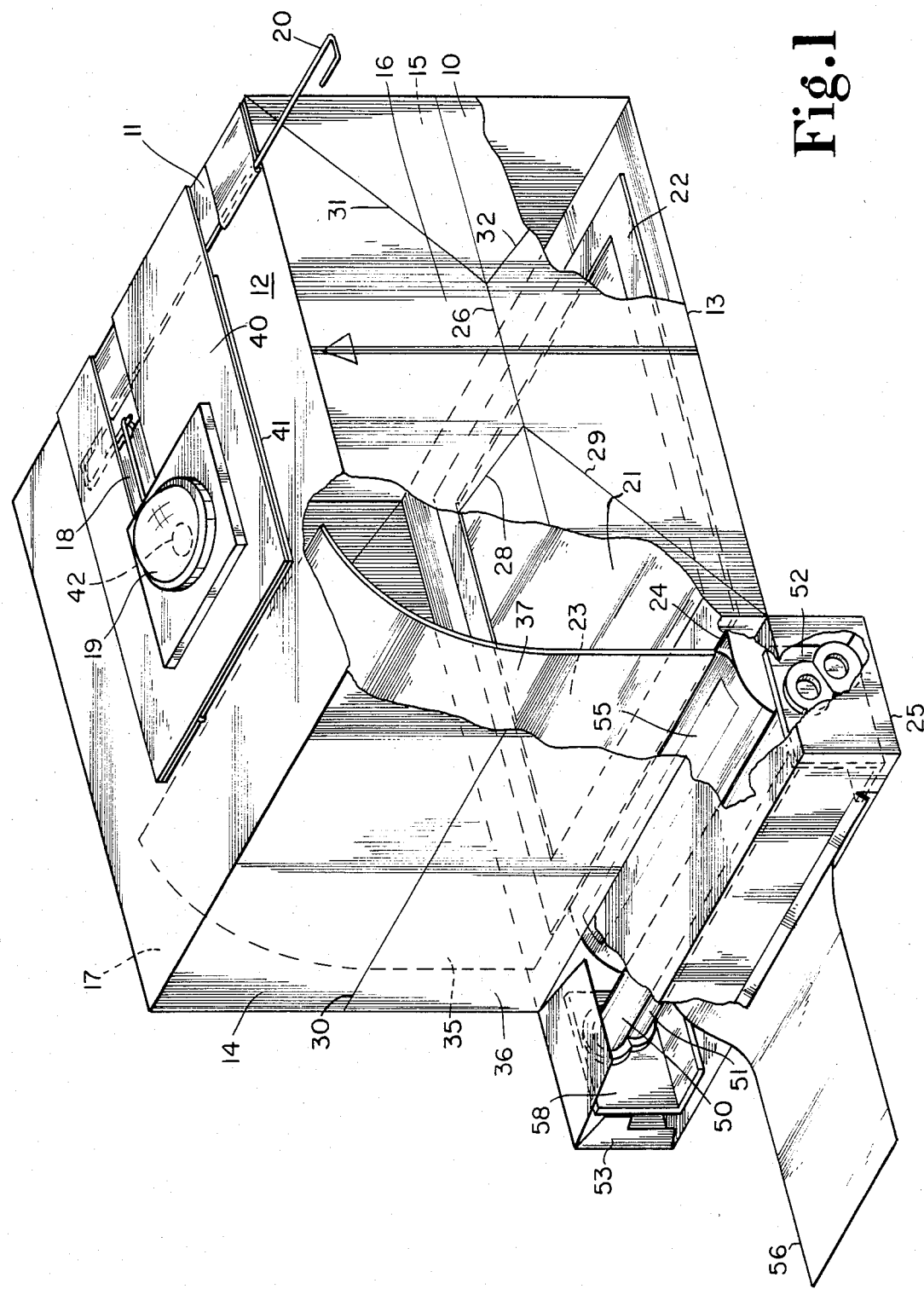
FIG. 1 is a fragmentary perspective view of a camera incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown a camera 10 having a collapsible main body 11 constructed of a low cost material such as paper, cardboard or fabric. Main body 11 includes a front wall 12 and a back wall 13 connected together by a pair of inwardly folding end walls 14 and 15 and a pair of outwardly folding side walls 16 and 17. An aperture 42 is provided in wall 12 and is closable by a shutter 18 disposed between the aperture and a fixed focal length non-adjustable lens 19. A shutter release 20 is operable to allow the user to control movement of the shutter past the aperture.

Located beneath the aperture and adjacent wall 13 is a sheet of photographic film 21 slidably mounted in a guide 22 and alignable with photographic paper 23 as the paper and film exit main body 11 via slot 24 with the film and photographic paper passing through a development mechanism 25 attached to amin body 11 adjacent slot 24.

Figure 2:
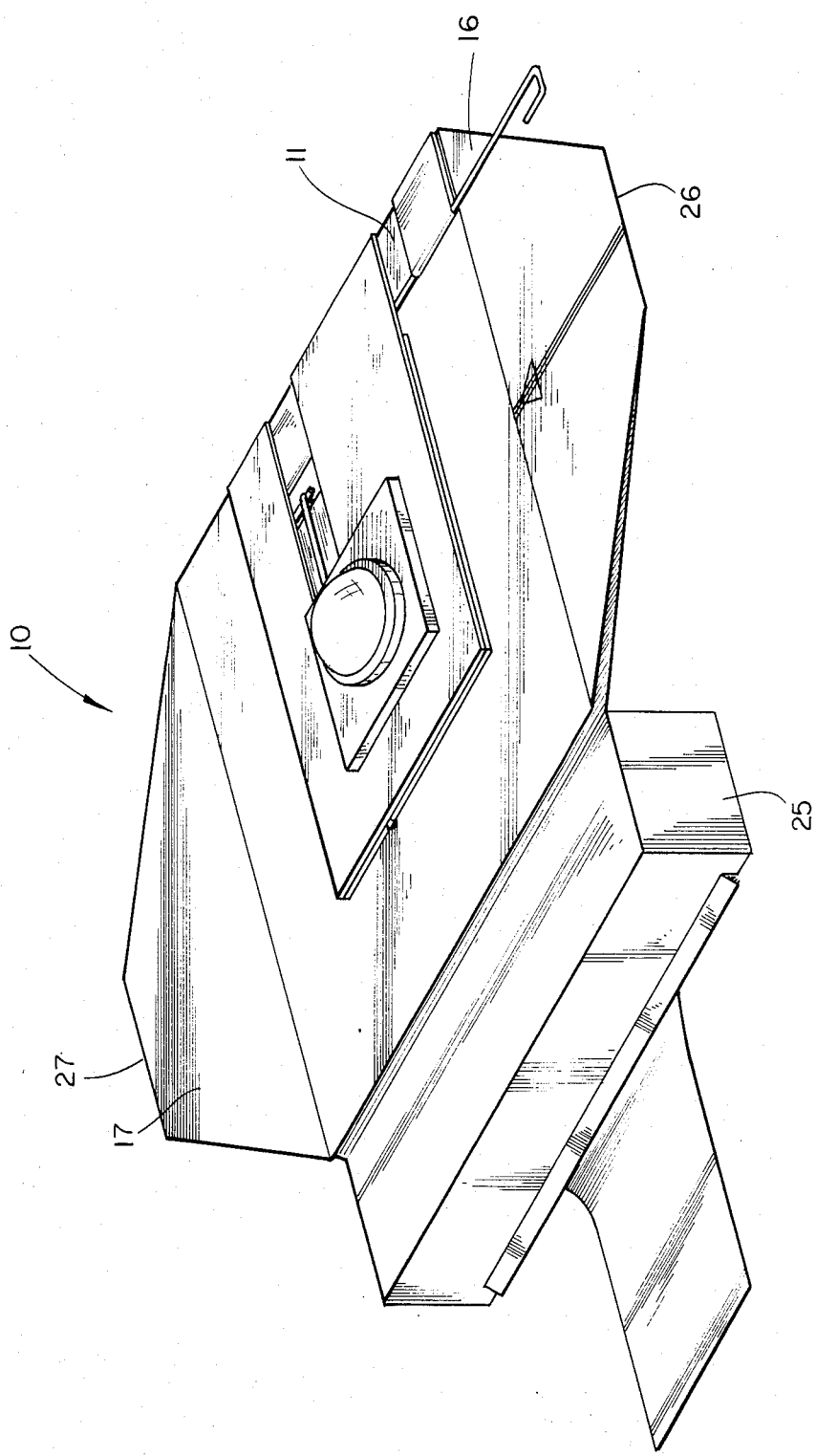
FIG. 2 is a perspective view of the camera of FIG. 1 shown in the collapsed state.
Figure 3:
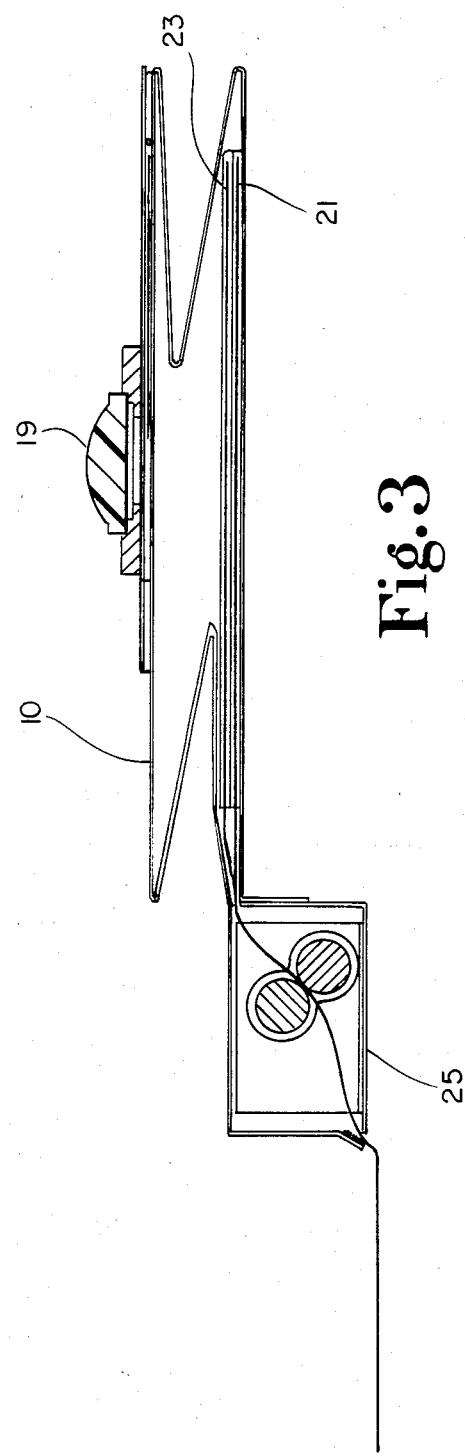
FIG. 3 is a cross-sectional view of the camera shown in the collapsed condition.

Camera 10 is moveable between an erected position shown in FIG. 1 to the collapsed position shown in FIG. 2. Both side walls 16 and 17 are foldable respectively along their lengthwise extending centerline 26 and 27. Further, the four corner edge portions of each side wall are folded inwardly to facilitate the inward folding of end walls 14 and 15. For example, a pair of diagonally extending crease lines 28 and 29 extend from centerline 16 divergingly outward to the top and bottom corners of side wall 16 immediately adjacent end wall 14. Thus, as side wall 16 folds outwardly, the portion of the side wall defined between crease lines 28, 29 and that portion of side wall 16 immediately adjacent end wall 14 folds inwardly along with end wall 14 which is creased along its lengthwise extending centerline 30. Likewise, a pair of diagonally extending crease lines 31 and 32 extend from centerline 26 towards the top and bottom corner of side wall 16 immediately adjacent end wall 15 with the portion of side wall 16 defined between crease lines 31 and 32 and end wall 15 folding inwardly with wall 15 as the camera is collapsed. End wall 15 likewise includes a lengthwise extending centerline defining a crease line to facilitate the inward folding of the end wall. Side wall 17 is constructed in a similar fashion to side wall 16 to allow the outward folding of side wall 17 when the camera is moved to the collapsed condition shown in FIG. 2.

Figure 4:
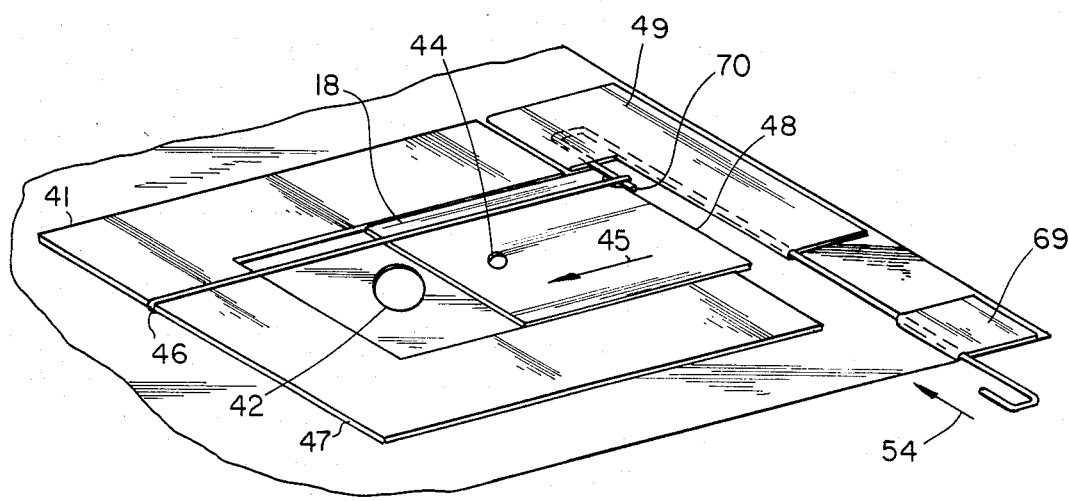
FIG. 4 is an enlarged fragmentary perspective view of the aperture and shutter combination.

As the camera is collapsed, it is imperative that the film 21 or photographic paper 23 not be creased. The creasing of either the film or photographic paper will result in improper developing due to misalignment of the negative with respect to the aperture or misalignment as the photographic paper and negative pass through the self-developing apparatus 25. In the prior art cameras, the negative is usually positioned closer to the aperture than the photographic paper which is curled beneath the negative. Upon exposure of the negative, the negative and photographic paper in the prior cameras are then wrapped around a pair of rollers to position the exposed surface of the negative next to the photographic paper. Such an approach is impossible in the camera disclosed herein since such a roller structure will result in creasing or misalignment of the negative and paper. Therefore, the negative 21 is positioned adjacent the bottom wall 13 of the camera and is slidably mounted in a negative guide 22 fixedly attached to the bottom wall 13. Guide 22 includes a pair of mutually opposed grooves to slidably receive the opposite longitudinally extending edges of the negative. Likewise, the photographic paper 23 is slidably mounted in a sleeve or guide 35 affixed to the bottom foldable portion 36 of the end wall 14. Sleeve 35 extends from the bottom edge of wall 14 past centerline 30 and then curls upwardly against wall 12. Photographic paper 23 extends freely within sleeve 35 and is also curled adjacent the top half of end wall 14 and the bottom surface of top wall 12 with the top edge of the sleeve and photographic paper being located between end wall 14 and lens 19 allowing for an unobstructed passage of light from the aperture beneath lens 19 to the upwardly facing surface of negative 21. Sleeve 37 extends entirely around photographic paper 23 in order to prevent light from reaching the paper. As the camera is collapsed, as shown in FIG. 2, the photographic paper 23 is merely positioned along with sleeve 35 atop guide 22 and negative 21 preventing creasing of the photographic paper. As shown in the cross-sectional view of FIG. 4, the photographic paper 23 is positioned parallel and above negative 21.

Figure 5:
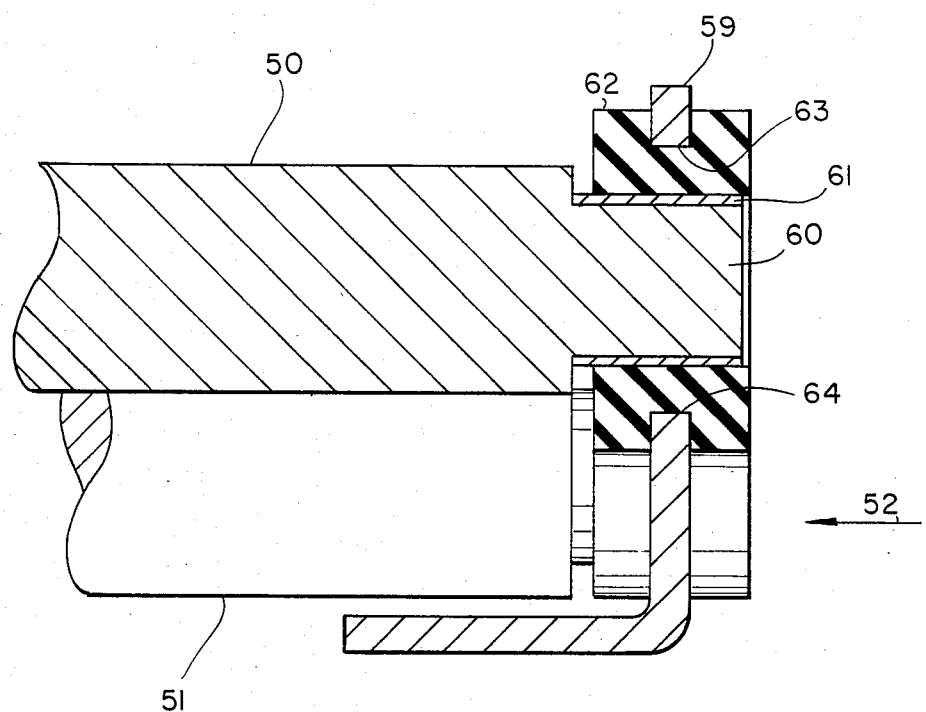
FIG. 5 is an enlarged cross-sectional view of bracket 52 showing the mounting of one of the rollers.

A pair of cardboard sheets 40 and 41 are fixedly mounted atop wall 12. The opposite edge portions of sheets 40 and 41 are secured together; however, the sheets are spaced apart their remaining portions to slidably receive a shutter sheet 18. An aperture hole 42 extends through wall 12 and sheets 40 and 41 with a fixed focal lens 19 being aligned with the aperture hole 42 and fixedly mounted atop sheet 40. Lens 19 and sheet 40 are removed from the top wall 12 in FIG. 5 to illustrate hole 42 in relationship to the shutter sheet 18. Shutter sheet 18 includes a shutter hole 44 which passes over and past aperture hole 42 as the shutter sheet moves in the direction of arrow 45 allowing for a controlled amount of light or image to pass through the aligned holes 42 and 44 thereby exposing negative 21. An elastic band 46 extends around sheets 41 and 18 and is operable when released to urge shutter sheet 18 in the direction of arrow 45. One end of elastic band 46 engages edge 47 of sheet 41 whereas the opposite end of the band engages edge 48. A slot is provided in sheets 40 and 41 adjacent edge 48 of shutter sheet 18 and extending in the direction of arrow 45 to prevent interference between the elastic band and sheets 40 and 41 as the shutter sheet 18 is moved in the direction of arrow 45.

A wire shutter release 20 is slidably mounted in a pair of holders 49 and 69 fixedly attached to top wall 12. One end 70 of wire release 20 is curled to engage the elastic band 46 thereby preventing the elastic band from urging the shutter sheet in the direction of arrow 45. Once the wire release is moved in the direction of arrow 54, end 70 will disengage the elastic band allowing the band to contact edge 48 of the shutter sheet moving the shutter sheet in the direction of arrow 45 and shutter hole 44 past aperture hole 42. The shutter speed may be varied by changing the configuration of shutter hole 44. For example, an elongated shutter hole 44 with its major axis extending in the direction of arrow 45 will allow for a longer film exposure time whereas a circular shutter hole 44 will provide for a shorter film exposure time.

Self-developing mechanism 25 includes a pair of parallel rollers 50 and 51 having their opposite ends rotatably mounted in a pair of upstanding brackets 52 and 58 fixedly attached to a rectangular configured box 53 in turn attached to the main body 11 of the camera. Self-developing photographic paper and associated negative are commercially available and are well known in the field. The negative 21 includes a packet of film developing material 55 fixed thereto and when crushed passing between rollers 50 and 51 is applied to the photographic developing surface of photographic paper 23 facing negative 21. The photographic paper and negative are affixed together at their outer ends forming a tab 56 to allow the user to pull the paper and negative through the rollers once the shutter release system is operated. As tab 56 is pulled outwardly, chemistry packet 55 passes between the rollers and is released onto and between the negative and photographic paper thereby developing the photograph. The photographic paper is then removed from the negative.

It is imperative that the developing material from packet 55 be applied uniformly across the width of the photographic paper. It is therefore necessary to apply a uniform pressure across the photographic paper and negative as the two pass between the pair of rollers. A bearing system is utilized to hold the opposite ends of the rollers to ensure the uniform distribution of pressure applied by the rollers to the photographic paper and film. The bearings provided in bracket 52 will now be described it being understood that an identical bearing construction is provided for bracket 58.

Roller 50 has a reduced diametered end 60 rotatably mounted and extending through a metal bearing 61 in turn extending through a flexible grommet 62 made from a material such as rubber. Grommet 62 has a circumferentially extending groove 63 allowing the grommet to be mounted in an oversized hole 64 provided in wall 59 of bracket 52. The opposite end of roller 50 is mounted in identical fashion to bracket 58. Likewise, the opposite ends of roller 51 are rotatably mounted in identical fashion to a pair of sleeves and grommets mounted to brackets 52 and 58. Normally, rollers 50 and 51 are spaced apart 0.004 inches whereas the combined thickness of the chemical packet 55 and photographic paper along with negative amounts to 0.011 inches. Thus, the rollers must move further apart in the amount of 0.007 inches. The rubber grommets 62 receiving the opposite ends of the rollers therefore are compressed uniformly allowing for the rollers to spread apart the required distance of 0.011 inches applying uniform pressure between the photographic paper and negative. Each rod moves approximately 0.0035 inches off its centerline. In one embodiment, approximately seven pounds of force is required to move the rods apart the required distance.

The camera disclosed herein is constructed to be of relatively low weight and is collapsible in order to facilitate mailing of the camera. Further, the camera is inexpensive to produce and distribute, small in size and provides an instant photograph while being very easy to use.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. A disposable camera comprising:
a camera box having an aperture and being moveable between a collapsed position and an erected position;
a lens mounted over said aperture;
shutter means mounted to said box adjacent said aperture and operable to open and close said aperture allowing light therethrough;
photographic paper within said box;
photographic negative within said box having a light developable surface facing said aperture; and,
first guide means mounted within said box and engaged with said photographic paper operable to position said paper in a flat, uncreased condition adjacent said light developable surface and between said aperture and said surface when in said collapsed position and to move said paper away from said surface allowing an unobstructed view from said aperture to said surface when in said erected position.

2. The camera of claim 1 wherein said box includes a front wall, back wall and side walls connecting together said front wall and back wall, said side walls are foldable allowing said box to assume said collapsed position with at least one side wall foldable inwardly; said first guide means includes a sleeve with a portion internally mounted to said one side wall to hold said paper thereagainst with the remaining portion of said sleeve with said paper curling out of the way of said aperture and negative as said box moves to said erected position.

3. The camera of claim 1 wherein said shutter means includes a member having a opening slidably mounted to said front wall and an elastic device engageable with said member, said shutter means further includes release means engaged with said elastic device and operable to release said elastic device against said member to slide said member and move said opening past said aperture.

4. The camera of claim 1 and further comprising;
photo developing means mounted to said box and operable to press said paper and negative together to develop a photo on said paper; and,
second guide means mounted within said box and engaged with said negative cooperatively operable with said first guide means to align said paper and negative together prior to exiting said box via said photo developing means.

5. The camera of claim 4 wherein said photo developing means includes a pair of rollers rotatably mounted to said box and normally spaced apart a first constant distance along their lengths and further includes mounting means on said box supporting said rollers and operable to allow said constant distance to increase to a second constant distance as said paper and said negative move therebetween.

6. The camera of claim 5 wherein said box is constructed at least partially of a paper material and includes a front wall with said lens mounted thereon, a back wall adjacent of which is located said negative and a pair of side walls folding outwardly when said box is in said collapsed position and when pushed inwardly erecting said box to said erected position.

7. The camera of claim 6 wherein said lens has a fixed focal length.

8. The camera of claim 7 wherein said shutter means has a non-adjustable speed.

9. The camera of claim 5 wherein said mounting means includes a pair of brackets mounted to said box each including a pair of oversized holes with grommets mounted therein, said mounting means further includes a separate bearing mounted in each grommet and rotatably receiving an end of one of said rollers, said grommets being stretchable in said oversized holes to allow said rollers to controllably move apart.

10. A disposable camera comprising;
a collapsible camera box including a front wall with aperture, a box wall with an interior negative guide and foldable side walls connecting said front wall to said back wall, one side wall having an interior photographic paper guide attached thereto;
a lens mounted to said front wall and aligned with said aperture;
shutter means mounted to said front wall and operable to open and close said aperture;
photographic negative slidably mounted to said negative guide to receive a light image from said aperture; and,
photographic paper slidably mounted to said paper guide and positioned atop said negative between said aperture and negative when said box is collapsed and positioned away therefrom against said one side wall and said top wall when said box is erected.

11. The camera of claim 10 wherein;
said side walls are arranged as one pair of inwardly folding walls and one pair of outwardly folding walls, said paper guide is attached to a portion of one of said inwardly folding walls.

12. The camera of claim 11 and further comprising developing means including a packet of photo development chemicals positioned adjacent said paper and a pair of rollers rotatably mounted adjacent said box and spaced apart a uniform distance along the length thereof;
tab means connected to said paper and said negative and extendable through said rollers being operable when pulled to force said packet, said paper and said negative to move through said rollers releasing said chemical and developing said paper.

13. The camera of claim 12 wherein said one inwardly folding wall has a top portion hinged to said top wall and a bottom portion hinged to said botton wall, said paper guide is attached to said bottom portion.

14. The camera of claim 13 wherein said paper extends straight through said paper guide and then curves with said paper guide adjacent said top portion of said top wall unobstructing any light passing from said aperture to said negative when said camera is erected.

15. The camera of claim 14 wherein said shutter means includes a member having an opening slidably mounted to said front wall and an elastic device engageable with said member and further having release means engaged with said elastic device and operable to release said elastic device against said member to slide said member and move said opening past said aperture.

16. The camera of claim 15 wherein said developing means includes a pair of rollers rotatably mounted to said box and normally spaced apart a first constant distance along their lengths and further including mounting means on said box supporting said rollers and operable to allow said constant distance to increase to a second constant distance as said paper and said negative pass therebetween.

* * * * *

UNITED STATES PATENT AND TRADEMARK OFFICE
CERTIFICATE OF CORRECTION

PATENT NO. : 4,518,235

DATED : May 21, 1985

INVENTOR(S) : Richard K. Reed, James R. Reed and James D. Sorg

It is certified that error appears in the above-identified patent and that said Letters Patent is hereby corrected as shown below:

Column 3, line 1, should read "attached to main body" rather than "attached to amin body".

Column 6, lines 14 and 50, the ";" after the words "comprising" should be changed to a ":".

Column 7, line 1, the ";" after the word "wherein" should be changed to a ":".

Signed and Sealed this

Eighth Day of October 1985

[SEAL]

Attest:

DONALD J. QUIGG

Attesting Officer

Commissioner of Patents and Trademarks—Designate